United States Patent
Tsukagoshi et al.

(10) Patent No.: US 12,288,899 B2
(45) Date of Patent: Apr. 29, 2025

(54) SEPARATOR AND NONAQUEOUS ELECTROLYTE SECONDARY BATTERY

(71) Applicant: Panasonic Intellectual Property Management Co., Ltd., Osaka (JP)

(72) Inventors: Takafumi Tsukagoshi, Hyogo (JP); Shinya Miyazaki, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 788 days.

(21) Appl. No.: 17/275,289

(22) PCT Filed: May 8, 2019

(86) PCT No.: PCT/JP2019/018313
§ 371 (c)(1),
(2) Date: Mar. 11, 2021

(87) PCT Pub. No.: WO2020/066108
PCT Pub. Date: Apr. 2, 2020

(65) Prior Publication Data
US 2022/0052420 A1    Feb. 17, 2022

(30) Foreign Application Priority Data
Sep. 25, 2018 (JP) .................. 2018-178980

(51) Int. Cl.
*H01M 50/449* (2021.01)
*H01M 10/052* (2010.01)
(Continued)

(52) U.S. Cl.
CPC ....... *H01M 50/449* (2021.01); *H01M 10/052* (2013.01); *H01M 50/443* (2021.01); *H01M 50/463* (2021.01)

(58) Field of Classification Search
CPC ............ H01M 50/449; H01M 50/463; H01M 50/443; H01M 10/052
See application file for complete search history.

(56) References Cited

U.S. PATENT DOCUMENTS

| 2013/0084483 A1 | 4/2013 | Lee et al. |
| 2014/0227603 A1 | 8/2014 | Ogata |

(Continued)

FOREIGN PATENT DOCUMENTS

| CN | 105051940 A | 11/2015 |
| CN | 108123089 A | 6/2018 |

(Continued)

OTHER PUBLICATIONS

Extended (Supplementary) European Search Report dated Nov. 4, 2021, issued in counterpart EP application No. 19865845.2. (8 pages).

(Continued)

*Primary Examiner* — Brian R Ohara
*Assistant Examiner* — Emily Elizabeth Freeman
(74) *Attorney, Agent, or Firm* — WHDA, LLP

(57) ABSTRACT

This separator is provided with a resin substrate, a first heat-resistant layer that covers the entirety of one surface of the resin substrate, a second heat-resistant layer that covers a portion of the other surface of the resin substrate, and an uncovered region that is in the other surface of the resin substrate and that is not covered by the second heat-resistant layer, wherein the first heat-resistant layer and the second heat-resistant layer each include inorganic particles and a binder. In each of the heat-resistant layers, the contained amount of the inorganic particles is 50-90 mass %, the contained amount of the binder is 10-50 mass %, and the uncovered region is connected to the end portion of the resin substrate.

13 Claims, 4 Drawing Sheets

(51) Int. Cl.
*H01M 50/443* (2021.01)
*H01M 50/463* (2021.01)

(56) References Cited

U.S. PATENT DOCUMENTS

| | | |
|---|---|---|
| 2015/0171393 A1 | 6/2015 | Ogata et al. |
| 2015/0372277 A1 | 12/2015 | Honda |
| 2017/0207480 A1 | 7/2017 | Jo et al. |
| 2019/0221880 A1* | 7/2019 | Hirai ............... B32B 27/281 |
| 2021/0242538 A1* | 8/2021 | Lee ............... H01M 50/414 |

FOREIGN PATENT DOCUMENTS

| | | | |
|---|---|---|---|
| JP | 2002-015773 A | 1/2002 | |
| JP | 2006-49114 A | 2/2006 | |
| JP | 5088856 B2 | 12/2012 | |
| JP | 2014-509777 A | 4/2014 | |
| JP | 2016-18773 A | 2/2016 | |
| JP | 2018-508093 A | 3/2018 | |
| WO | WO-2013118627 A1 * | 8/2013 | ............ H01M 10/04 |
| WO | 2019/114692 A1 | 6/2019 | |

OTHER PUBLICATIONS

English Translation of Search Report dated Jul. 8, 2022, issued in counterpart CN Application No. 201980048862.2. (3 pages).
International Search report dated Jul. 16, 2019, issued in counterpart Application No. PCT/JP2019/018313. (2 pages).

* cited by examiner

SEPARATOR AND NONAQUEOUS ELECTROLYTE SECONDARY BATTERY

This application is a U.S. national stage application of the PCT international application No.PCT/JP2019/018313 filed on May 8, 2019, which claims the benefit of foreign priority of Japanese patent application No. 2018-178980 filed on September 25. 2018, the contents all of which are incorporated herein by reference.

TECHNICAL FIELD

The present disclosure relates to technique for a separator and a non-aqueous electrolyte secondary battery.

BACKGROUND ART

Recently, a non-aqueous electrolyte secondary battery comprising an electrode assembly having a positive electrode, a negative electrode, and a separator disposed between the positive electrode and the negative electrode, a non-aqueous electrolyte, and a battery case housing these members has been widely used as a secondary battery providing high output and a large energy density.

However, thinning the separator and densifying the electrodes are promoted to increase the capacity of the non-aqueous electrolyte secondary battery, and a problem with this is that it is difficult for a non-aqueous electrolyte to penetrate into the inner part of the electrode assembly in producing a battery. If the penetration of a non-aqueous electrolyte into the inner part of the electrode assembly is insufficient, it is necessary to leave the battery to stand for a long period of time or treat the battery at a high temperature after the non-aqueous electrolyte is poured into the battery case housing the electrode assembly, and this may lead to increase in production cost. There is also a risk that a side reaction may occur in the battery while the battery is left for a long period of time or treated at a high temperature, to result in deterioration of battery characteristics. Also, if the non-aqueous electrolyte does not penetrate into the inner part of the electrode assembly sufficiently, deposition of Li or others may occur during charge/discharge of the battery, to reduce the safety of the battery. Accordingly, it is an important challenge to improve the penetration of a non-aqueous electrolyte into the inner part of the electrode assembly.

For example, Patent Literature 1 suggests technique for securing a penetration path for a non-aqueous electrolyte by forming unevenness on an electrode.

For example. Patent Literature 2 suggests technique for securing a penetration path for a non-aqueous electrolyte by forming a void formed by a bonding region and a non-bonding region on a separator, wherein an electrode and the separator are bonded with each other in the bonding region, and the void is in communication with the edge of the electrode.

CITATION LIST

Patent Literature

PATENT LITERATURE 1: Japanese Patent No. 5088856
PATENT LITERATURE 2: Japanese Unexamined Patent Application Publication No. 2002-15773

SUMMARY

If abnormal heat generation due to sticking of a foreign matter (e.g., a metal product such as nails) occurs in a non-aqueous electrolyte secondary battery, the separator deforms (e.g., shrinks) to result in direct contact of the positive electrode with the negative electrode or failure in maintaining the insulation properties of the separator, which may allow a current to flow between the positive electrode and the negative electrode via the foreign matter, thereby causing variation in voltage. These cases may lead to further heat generation in the battery, thereby reducing the safety of the battery. In Patent Literature 2, the bonding region on the separator is provided to bond the electrode and the separator to each other, and thus the bonding region has a low heat resistance and has almost no capability to suppress the deformation or the like of the separator during abnormal heat generation due to sticking of a foreign matter (e.g., a metal product such as nails).

An object of the present disclosure is to provide a separator that achieves sufficient penetration of a non-aqueous electrolyte and suppresses the deformation of the separator and the variation in voltage of a battery during abnormal heat generation due to sticking of a foreign matter (e.g., a metal product such as nails), and a non-aqueous electrolyte secondary battery comprising the separator.

A separator according to one aspect of the present disclosure comprises a resin substrate, a first heat-resistant layer covering the whole of a first surface of the resin substrate, a second heat-resistant layer covering part of a second surface of the resin substrate, and a non-covered region on the second surface of the resin substrate, the non-covered region not being covered with the second heat-resistant layer, wherein the first heat-resistant layer and the second heat-resistant layer each include inorganic particles and a binder, a content of the inorganic particles in each heat-resistant layer is 50 mass % to 90 mass %, and a content of the binder in each heat-resistant layer is 10 mass % to 50 mass %, and the non-covered region is in communication with an edge of the resin substrate.

A non-aqueous electrolyte secondary battery according to one aspect of the present disclosure comprises a positive electrode, a negative electrode, and the above-described separator, the separator being disposed between the positive electrode and the negative electrode.

According to one aspect of the present disclosure, there may be provided a separator that achieves sufficient penetration of a non-aqueous electrolyte and suppresses the deformation of the separator and the variation of voltage of a battery during abnormal heat generation due to sticking of a foreign matter (e.g., a metal product such as nails), and a non-aqueous electrolyte secondary battery comprising the separator.

DESCRIPTION OF EMBODIMENTS

Figure 1:
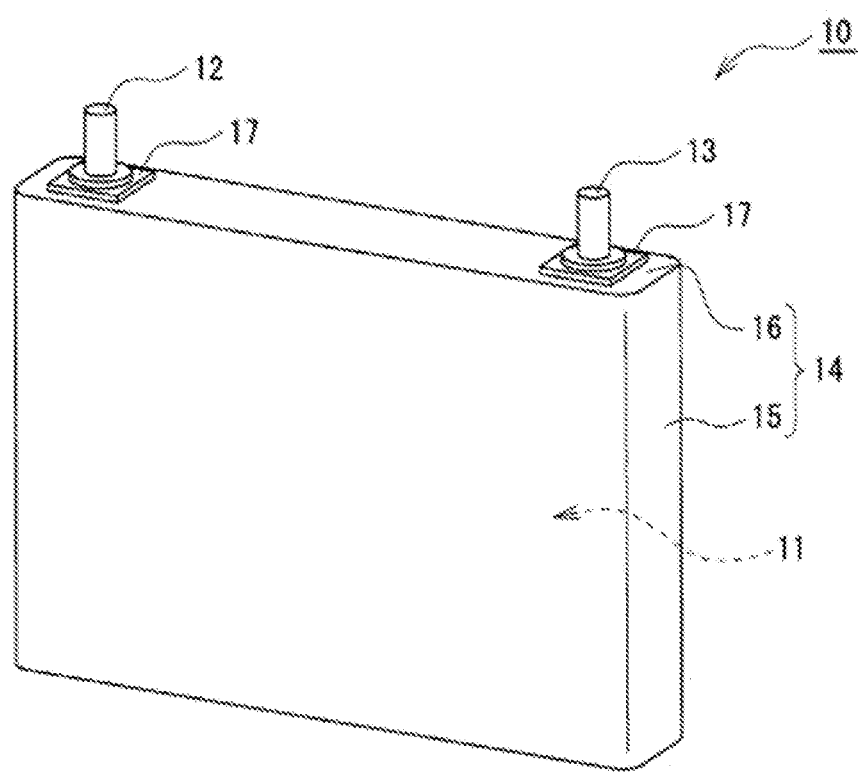
FIG. 1 is a schematic perspective view of a non-aqueous electrolyte secondary battery of an exemplary embodiment.

Hereinafter, exemplary embodiments will be described in detail. The drawings which are referred to in the description of the embodiments are schematically illustrated. The ratio of the dimensions and the like of the components depicted in the drawings may be different from those of actual products.

FIG. 1 is a schematic perspective view of a non-aqueous electrolyte secondary battery of an exemplary embodiment. A non-aqueous electrolyte secondary battery 10 shown in FIG. 1 is a rectangular battery; however, the non-aqueous electrolyte secondary battery of the present disclosure is not limited thereto, and any conventionally known form such as a cylindrical battery, a coin-shaped battery, a button-shaped battery, or a laminate type battery may be applied.

The non-aqueous electrolyte secondary battery 10 shown in FIG. 1 comprises: an electrode assembly 11, a non-aqueous electrolyte, and a battery case 14. The electrode assembly 11 and the non-aqueous electrolyte are housed in the battery case 14. The electrode assembly 11 has a positive electrode, a negative electrode, and a separator interposed between the positive electrode and the negative electrode, though the specific configuration of the electrode assembly 11 will be described later.

The battery case 14 has: a rectangular case body 15 with a closed-end, the case body having an opening in the upper part: a sealing assembly 16 for closing the opening of the case body 15; a positive electrode terminal 12 electrically connected to the positive electrode: and a negative electrode terminal 13 electrically connected to the negative electrode. The case body 15 and the sealing assembly 16 are made of a metallic material including, for example, aluminum as a main component. The positive electrode terminal 12 and the negative electrode terminal 13 are fixed to the sealing assembly 16 with an insulating member 17 interposed therebetween. Generally, the sealing assembly 16 is provided with a mechanism for discharging gas (not shown). The form of the battery case 14 is not limited to that described above, and any conventionally known form such as a metallic case having a cylindrical shape, a coin shape, a button shape, or another shape, and a resin case formed by laminating resin sheets (laminate type) may be applied.

Figure 2:
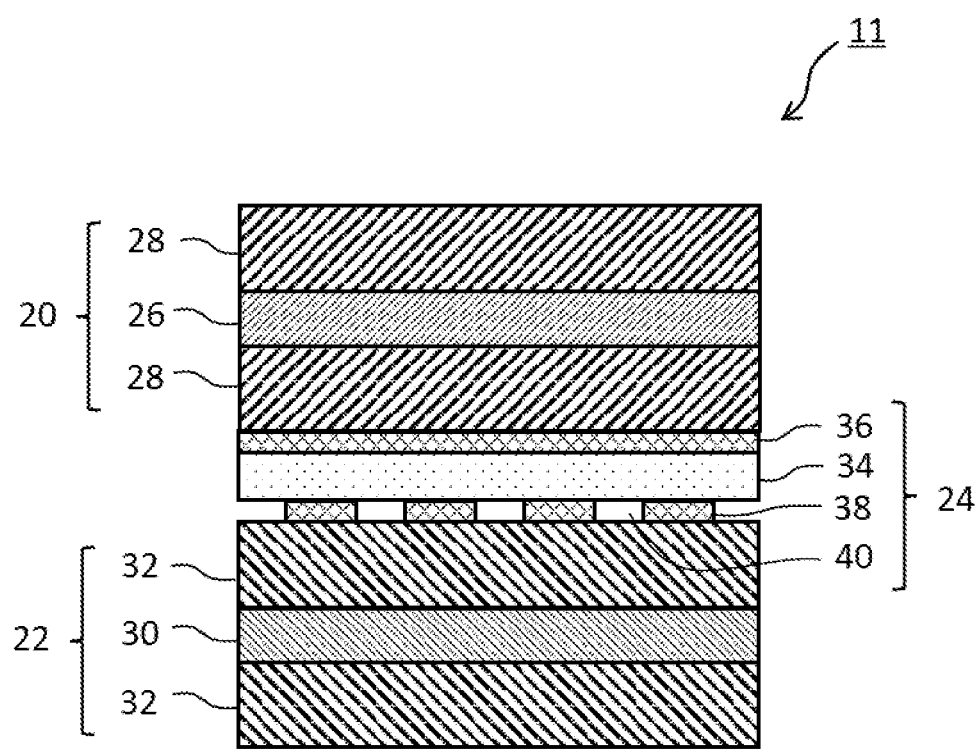
FIG. 2 is a schematic sectional view of an electrode assembly of an exemplary embodiment.

FIG. 2 is a schematic sectional view of an electrode assembly of an exemplary embodiment. The electrode assembly 11 shown in FIG. 2 is a laminate type electrode assembly including rectangular positive electrodes 20 and rectangular negative electrodes 22 alternately stacked with rectangular separators 24 interposed therebetween. The form of the electrode assembly 11 is not limited thereto, and the electrode assembly 11 may be, for example, an electrode assembly having a wound structure in which the positive electrode 20 and the negative electrode 22 are wound together with the separator 24 interposed therebetween. The shape of the positive electrode 20, that of the negative electrode 22, and that of the separator 24 are not limited to a rectangle, and may be a circle or other shapes.

The positive electrode 20 shown in FIG. 2 comprises a positive electrode current collector 26, which is metal foil or the like, and positive electrode mixture layers 28, which are formed on both surfaces of the positive electrode current collector 26. The negative electrode 22 shown in FIG. 2 comprises a negative electrode current collector 30, which is metal foil or the like, and negative electrode mixture layers 32, which are formed on both surfaces of the negative electrode current collector 30. The members of the positive electrode 20 and the negative electrode 22 will be described later in detail.

The separator 24 shown in FIG. 2 has a resin substrate 34, a first heat-resistant layer 36 covering the whole of a first surface of the resin substrate 34, a second heat-resistant layer 38 covering part of a second surface of the resin substrate 34, and a non-covered region 40 on the second surface of the resin substrate 34, the non-covered region 40 not being covered with the second heat-resistant layer 38. The non-covered region 40 is a region where the resin substrate 34 is exposed. The first heat-resistant layer 36 and the second heat-resistant layer 38 each include predetermined amounts of inorganic particles and a binder. The contents of the inorganic particles and the binder will be described later.

The resin substrate 34 is not particularly limited as long as it is a substrate including mainly a resin material, and examples thereof include polyolefin resins such as PE (polyethylene), PP (polypropylene), PET (polyethylene terephthalate), and PBT (polybutylene terephthalate), a PPS (polyphenylene sulfide) resin, a PEEK (polyetheretherketone) resin, and a PI (polyimide) resin. In particular, it is preferable to use a polyolefin resin, which has a high sticking strength. The thickness of the resin substrate 34 is optionally determined, and, for example, is within a range from 5 μm to 30 μm. The resin substrate 34 preferably includes 90 mass % or more, more preferably 100 mass %, of the resin material based on the mass of the resin substrate 34.

Figure 3:
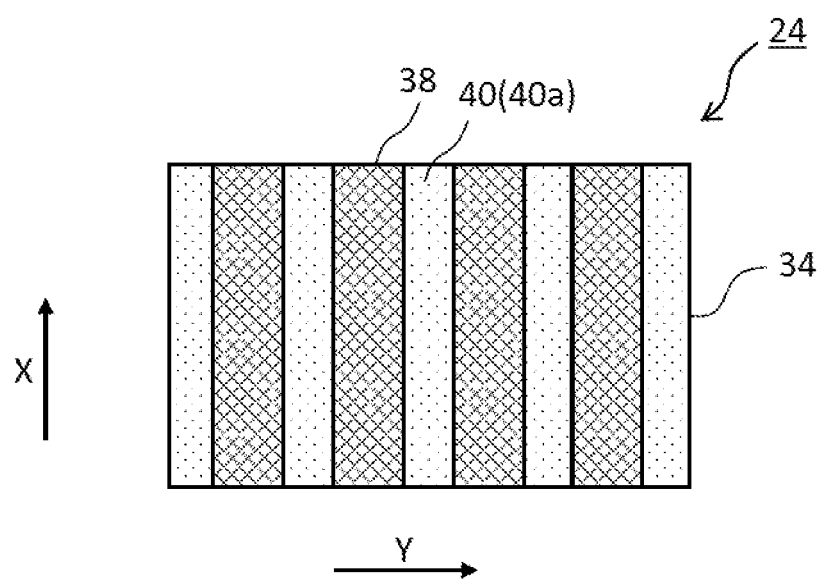
FIG. 3 is a schematic plane view of a separator which is viewed from the second heat-resistant layer side (the second surface side of the resin substrate).

FIG. 3 is a schematic plane view of the separator which is viewed from the second heat-resistant layer side (the second surface side of the resin substrate). As shown in FIG. 3, the non-covered region 40 on the second surface of the resin substrate includes a lateral non-covered region 40a, which extends from one lateral edge to the other lateral edge in the lateral direction (arrow X) of the resin substrate 34. The lateral non-covered region 40a is in communication with both lateral edges of the resin substrate 34. As shown in FIG. 3, a plurality of the non-covered regions 40 may be arranged at predetermined intervals in the longitudinal direction (arrow Y) of the resin substrate 34. In other words, the non-covered regions 40 and the regions covered with the second heat-resistant layer 38 may be alternately arranged in the longitudinal direction of the resin substrate 34.

Figure 4:
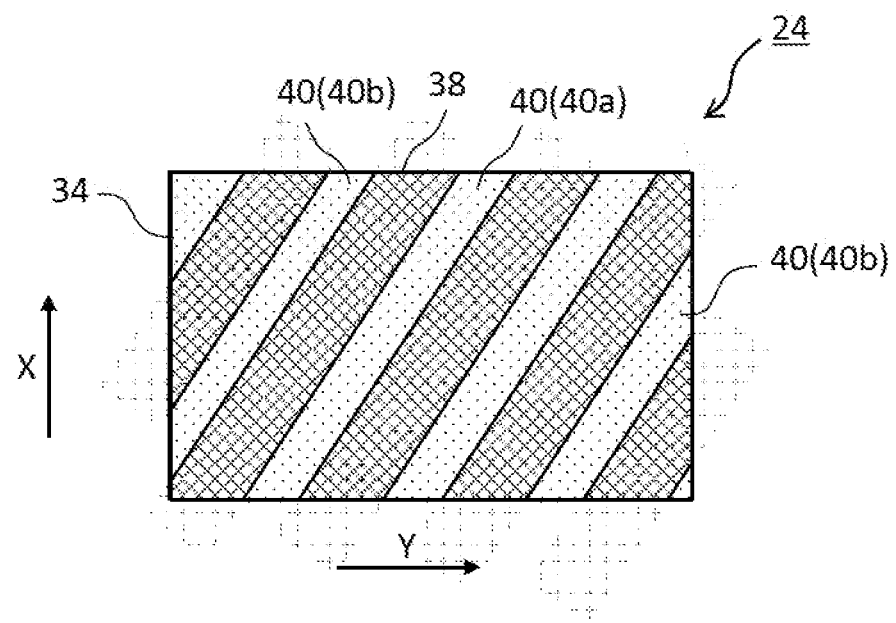
FIG. 4 is a schematic plane view showing another exemplary separator which is viewed from the second heat-resistant layer side (the second surface side of the resin substrate).

FIG. 4 is a schematic plane view showing another exemplary separator which is viewed from the second heat-resistant layer side (the second surface side of the resin substrate). As shown in FIG. 4, the non-covered region 40 on the second surface of the resin substrate 34 may be oblique relative to the lateral direction of the resin substrate 34. In other words, the non-covered region 40 includes the lateral non-covered region 40a, which is oblique relative to the lateral direction of the resin substrate 34 and extends from one lateral edge to the other lateral edge of the resin substrate 34. The lateral non-covered region 40a is in communication with both longitudinal edges of the resin substrate 34. In FIG. 4, the non-covered region 40 also includes a lateral non-covered region 40b, which is oblique relative to the lateral direction of the resin substrate 34 and extends from one lateral edge to one longitudinal edge, or from the other lateral edge to the other longitudinal edge. The lateral non-covered region 40b is in communication with a lateral edge and a longitudinal edge. As shown in FIG. 4, a plurality of the non-covered regions 40 (lateral non-covered regions 40a, 40b) may be arranged at predetermined intervals in the longitudinal direction of the resin substrate 34. In other words, the non-covered regions 40 (lateral non-covered regions 40a, 40b) and the regions covered with the second heat-resistant layer 38 may be alternately arranged in the longitudinal direction of the resin substrate 34.

The form of the non-covered region 40 in the plane view is not particularly limited and may be, for example, linear, circular arc-shaped, or wavy, and it is preferably linear in view of, for example, ease of formation.

The non-covered region 40, which is in communication with an edge of the resin substrate 34, serves as a flow channel for the non-aqueous electrolyte. Accordingly, when the non-aqueous electrolyte is poured into the battery case 14 housing the electrode assembly 11, the non-aqueous electrolyte passes from the edge of the resin substrate 34 through the non-covered region 40 to penetrate into the inner part of the electrode assembly 11. Thus, the penetration of a non-aqueous electrolyte into the electrode assembly 11 can be increased by using the separator 24, which has the non-covered region 40 in communication with an edge of the resin substrate 34 on the surface of the resin substrate 34.

The non-covered region 40 on the second surface of the resin substrate 34 may include a longitudinal non-covered region extending from one longitudinal edge to the other longitudinal edge in the longitudinal direction of the resin substrate 34 (in other words, the longitudinal non-covered region is in communication with both longitudinal edges of the resin substrate 34), though any drawings for the description are omitted. However, the longitudinal non-covered region is a flow channel which is too long for the non-aqueous electrolyte to flow, and it may be thus difficult to cause the non-aqueous electrolyte to efficiently penetrate into the inner part of the electrode assembly 11. Accordingly, the lateral non-covered region extending from one lateral edge to the other lateral edge of the resin substrate 34 is preferable to the longitudinal non-covered region extending from one longitudinal edge to the other longitudinal edge of the resin substrate 34 in view of improving the penetration of the non-aqueous electrolyte into the electrode assembly 11.

The heat-resistant layers (the first heat-resistant layer 36 and the second heat-resistant layer 38) have heat resistance and insulation properties and thus have the capability to suppress the deformation (e.g., a shrink) of the separator 24 or the deterioration in the insulation properties of the separator 24 during abnormal heat generation of the battery due to sticking of a foreign matter (e.g., a metal product such as nails). However, if not only the heat-resistant layers but also the non-covered region 40 are formed on both surfaces of the resin substrate 34, the deformation of the separator 24 or the deterioration in the insulation properties of the separator 24 occurs during abnormal heat generation due to sticking of a foreign matter, which may result in the variation of voltage of the battery. In order to suppress such a deformation or deterioration in the insulation properties of the separator 24 to suppress the variation of voltage of the battery, it is necessary that the whole of the first surface of the resin substrate 34 should be covered with a heat-resistant layer, as with the first heat-resistant layer 36 in the present embodiment. The total area of the second heat-resistant layer 38 is preferably 70% to 95% based on the area of the second surface of the separator 24 (the area of the non-covered region 40 is preferably 5% to 20% based on the area of the second surface of the separator 24).

The abnormal heat generation of the battery due to sticking of a foreign matter occurs mainly on the positive electrode 20 side, and thus the first heat-resistant layer 36, which covers the whole of the first surface of the resin substrate 34, preferably faces the positive electrode 20 as shown in FIG. 2. Such a configuration can effectively suppress the deformation of the separator 24 during abnormal heat generation of the battery due to sticking of a foreign matter.

The content of the inorganic particles in the first heat-resistant layer 36 is 50 mass % to 90 mass %, and preferably 60 mass % to 80 mass %, and the content of the binder in the first heat-resistant layer 36 is 10 mass % to 50 mass %, and preferably 20 mass % to 40 mass %. The content of the inorganic particles in the second heat-resistant layer 38 is 50 mass % to 90 mass %, and preferably 60 mass % to 80 mass %, and the content of the binder in the second heat-resistant layer 38 is 10 mass % to 50 mass %, and preferably 20 mass % to 40 mass %. If the content of the inorganic particles and that of the binder are less than 50 mass % and more than 50 mass %, respectively, in the first heat-resistant layer 36 or the second heat-resistant layer 38, the heat-resistant layer exhibits insufficient heat resistance due to the low inorganic particle content, and thus the deformation of the separator 24 cannot be sufficiently suppressed during abnormal heat generation of the battery due to sticking of a foreign matter. If the content of the inorganic particles and that of the binder are more than 90 mass % and less than 10 mass %, respectively, in the first heat-resistant layer 36 or the second heat-resistant layer 38, the mechanical strength of the heat-resistant layer is decreased to lead a crack or the like, which renders retention of the layer difficult.

Examples of the inorganic particles include metal oxide particles, metal nitride particles, metal fluoride particles, and metal carbide particles. Examples of the metal oxide particles include aluminum oxide, titanium oxide, magnesium oxide, zirconium oxide, nickel oxide, silicon oxide, and manganese oxide. Examples of the metal nitride particles include titanium nitride, boron nitride, aluminum nitride, magnesium nitride, and silicon nitride. Examples of the metal fluoride particles include aluminum fluoride, lithium fluoride, sodium fluoride, magnesium fluoride, calcium fluoride, and barium fluoride. Examples of the metal carbide particles include silicon carbide, boron carbide, titanium carbide, and tungsten carbide. These may be used alone or in combinations of two or more thereof.

Examples of the binder include fluororesins, such as polyvinylidene fluoride (PVDF), polytetrafluoroethylene (PTFE), and polyvinyl fluoride (PVF); fluororubber, such as a vinylidene fluoride/hexafluoropropylene/tetrafluoroethylene copolymer and an ethylene/tetrafluoroethylene copolymer; rubbers, such as a styrene/butadiene copolymer and hydrides thereof, an acrylonitrile/butadiene copolymer and hydrides thereof, an acrylonitrile/butadiene/styrene copolymer and hydrides thereof, a methacrylate ester/acrylate ester copolymer, a styrene/acrylate ester copolymer, an acrylonitrile/acrylate ester copolymer, ethylene propylene rubber, polyvinyl alcohol, and polyvinyl acetate; resins such as polyphenylene ether, polysulfone, polyethersulfone, polyphenylene sulfide, polyetherimide, polyamideimide, polyamide, polyester, polyacrylonitrile, cellulose, an ethylene-vinyl acetate copolymer, polyvinyl chloride, isoprene rubber, butadiene rubber, methyl polyacrylate, ethyl polyacrylate, and polyvinyl alcohol; and water-soluble polymers, such as carboxymethyl cellulose (CMC), acrylamide, polyvinyl alcohol, methyl cellulose, guar gum, sodium alginate, carrageenan, xanthan gum, and salts thereof. Among these, polyvinylidene fluoride is preferable in view of, for example, heat resistance. These may be used alone or in combinations of two or more thereof.

An exemplary method for producing the separator 24 will be described. A slurry including the inorganic particles and the binder is applied to the whole of the first surface of the resin substrate 34 and then dried to form the first heat-resistant layer 36. Subsequently, a plurality of strips of masking tape are stuck on the second surface of the resin substrate 34 at predetermined intervals in the longitudinal direction of the resin substrate 34, and the above-described slurry is applied to the whole of the second surface of the resin substrate 34 and dried. Then the strips of masking tape are peeled off to form the second heat-resistant layer 38 and non-covered regions 40.

The positive electrode 20, the negative electrode 22, and the non-aqueous electrolyte will be described below.

As the positive electrode current collector 26 included in the positive electrode 20, foil of a metal that is stable in the electric potential range of the positive electrode 20, such as aluminum, a film with such a metal disposed as an outer layer, or the like may be used.

The positive electrode mixture layer 28 included in the positive electrode 20 includes a positive electrode active material. The positive electrode mixture layer 28 preferably includes a conductive agent and a binder in addition to the positive electrode active material. The thickness of the positive electrode 20 is, for example, 10 µm or more.

For example, the positive electrode 20 can be produced by preparing a positive electrode mixture slurry including a positive electrode active material, a conductive agent, and a binder, applying the positive electrode mixture slurry to the positive electrode current collector 26, drying the resultant to form the positive electrode mixture layers 28, and then press-molding the positive electrode mixture layers 28.

Examples of the positive electrode active material include a lithium/transition metal oxide. The metal element included in the lithium/transition metal oxide is, for example, at least one selected from cobalt (Co), nickel (Ni), manganese (Mn), magnesium (Mg), aluminum (Al), calcium (Ca), scandium (Sc), titanium (Ti), vanadium (V), chromium (Cr), iron (Fe), copper (Cu), zinc (Zn), gallium (Ga), germanium (Ge), yttrium (Y), zirconium (Zr), tin (Sn), antimony (Sb), tungsten (W), lead (Pb), and bismuth (Bi). Among these, at least one selected from Co, Ni, Mn, and Al is preferably included.

Examples of the conductive agent include carbon materials, such as carbon black, acetylene black, ketjen black, and graphite. These may be used alone or may be used in combinations of two or more thereof.

Examples of the binder include a fluororesin, such as polytetrafluoroethylene (PTFE) and polyvinylidene fluoride (PVdF), polyacrylonitrile (PAN), polyimide, an acrylic resin, and polyolefin. These resins may be used in combination with carboxymethyl cellulose (CMC) or a salt thereof, polyethylene oxide (PEO), or others. These may be used alone or may be used in combinations of two or more thereof.

As the negative electrode current collector 30 included in the negative electrode 22, foil of a metal that is stable in the electric potential range of the negative electrode 22, such as copper, a film with such a metal disposed as an outer layer or the like, may be used.

The negative electrode mixture layer 32 included in the negative electrode 22 includes a negative electrode active material. The negative electrode mixture layer 32 preferably includes a binder in addition to the negative electrode active material. The thickness of the negative electrode 22 is, for example, 10 µm or more.

For example, the negative electrode 22 can be produced by preparing a negative electrode mixture slurry including a negative electrode active material, a binder, and other components, applying the negative electrode mixture slurry to the negative electrode current collector 30, drying the resultant to form the negative electrode mixture layers 32, and then press-molding the negative electrode mixture layers 32.

The negative electrode active material is not particularly limited as long as it can reversibly intercalate and deintercalate lithium ions, and for example, carbon materials, such as natural graphite and artificial graphite, a metal that can be alloyed with lithium, such as silicon (Si) and tin (Sn), or an alloy or complex oxide that includes a metal element such as Si or Sn can be used. These may be used alone or may be used in combinations of two or more thereof.

As the binder, a fluororesin. PAN, polyimide, an acrylic resin, polyolefin, or the like can be used as in the positive electrode 20. When a mixture slurry is prepared using an aqueous solvent, CMC or a salt thereof, styrene/butadiene rubber (SBR), polyacrylic acid (PAA) or a salt thereof, polyvinyl alcohol (PVA) or the like is preferably used.

Non-Aqueous Electrolyte

The non-aqueous electrolyte includes a non-aqueous solvent and a solute (electrolyte salt) dissolved in the non-aqueous solvent. Examples of the non-aqueous solvent to be used include esters, ethers, nitriles, amides such as dimethylformamide, isocyanates such as hexamethylene diisocyanate, and mixed solvents of two or more thereof. The non-aqueous solvent may contain a halogen-substituted product formed by replacing at least one hydrogen atom of any of the above solvents with a halogen atom such as fluorine.

Examples of the esters include cyclic carbonate esters, such as ethylene carbonate (EC), propylene carbonate (PC), and butylene carbonate; chain carbonate esters, such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylate esters, such as γ-butyrolactone and γ-valerolactone; and chain carboxylate esters, such as methyl acetate, ethyl acetate, propyl acetate, methyl propionate (MP), and ethyl propionate.

Examples of the ethers include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the nitriles include acetonitrile, propionitrile, butyronitrile, valeronitrile, n-heptanitrile, succinonitrile, glutaronitrile, ajiponitrile, pimelonitrile, 1,2,3-propanetricarbonitrile, and 1,3,5-pentanetricarbonitrile.

Examples of the halogen-substituted product include a fluorinated cyclic carbonate ester such as fluoroethylene carbonate (FEC), and a fluorinated chain carbonate ester, and a fluorinated chain carboxylate ester such as methyl fluoropropionate (FMP).

Examples of the electrolyte salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (where $1<x<6$, and n is 1 or 2), $LiB_{10}Cl_{10}$, LiCl, LiBr, LiI, chloroborane lithium, and lithium lower aliphatic carboxylates; borate salts, such as $Li_2B_4O_7$ and $Li(B(C_2O_4)F_2)$; and imide salts, such as $LiN(SO_2CF_3)_2$ and $LiN(C_lF_{2l+1}SO_2)$ $C_mF_{2m+1}+SO_2)$ (where l and m are integers of 0 or more). These electrolyte salts may be used alone or two or more thereof may be mixed and used. The concentration of the electrolyte salt is, for example, 0.8 to 1.8 moles per L of the non-aqueous solvent.

EXAMPLES

Hereinafter, the present disclosure will be described in more details by way of Examples, but the present disclosure is not limited thereto.

Example

Production of Positive Electrode

A lithium/transition metal oxide represented by $LiNi_{1/3}Co_{1/3}Mn_{1/3}O_2$ was used as a positive electrode active material, and 94 mass % of the positive electrode active material, 4 mass % of acetylene black, and 2 mass % of polyvinylidene fluoride were mixed. To this mixture, an adequate amount of N-methyl-2-pyrrolidone (NMP) was further added to prepare a positive electrode mixture slurry. Then, the positive electrode mixture slurry was applied to a positive electrode current collector made of aluminum foil such that part to which a lead was to be connected was left uncoated, and the resulting coatings were dried. The coatings were pressed, and the resultant was then cut into a prescribed size of an electrode to produce positive electrodes each having positive electrode mixture layers formed on both respective surfaces of the positive electrode current collector.

Production of Negative Electrode

A mixture obtained by mixing graphite and SiO in a mass ratio of 96/4 was used as a negative electrode active material, and 98 mass % of the negative electrode active material, 1 mass % of SBR, and 1 mass % of CMC were mixed. To this mixture, an adequate amount of water was further added to prepare a negative electrode mixture slurry. Then, the negative electrode mixture slurry was applied to a negative electrode current collector made of copper foil such that part to which a lead was to be connected was left uncoated, and the resulting coatings were dried. The coatings were pressed, and the resultant was then cut into a prescribed size of an electrode to produce negative electrodes each having negative electrode mixture layers formed on both respective surfaces of the negative electrode current collector.

Production of Separator 50 mass % of polyvinylidene fluoride and 50 mass % of aluminum oxide were mixed, and to this mixture an adequate amount of N-methyl-2-pyrrolidone (NMP) was further added to prepare a slurry for a heat-resistant layer. Then, the slurry for a heat-resistant layer was applied to the whole of the first surface of a resin substrate made of polyethylene with a thickness of 12 µm, and dried to form a first heat-resistant layer. Then, the slurry for a heat-resistant layer was applied to the second surface of the resin substrate such that the coated regions (width: 5 cm) and uncoated regions (width: 5 mm) were alternated in the longitudinal direction of the resin substrate, and the resultant was dried to form a second heat-resistant layer and non-covered regions.

Preparation of Non-Aqueous Electrolyte

A mixed solvent was obtained by mixing ethylene carbonate (EC), ethylene fluoride carbonate (FEC), and diethyl carbonate (DEC) in a volume ratio of 27:3:70, and vinylene carbonate (VC) was added to the mixed solvent in an amount of 1 mass %. $LiPF_6$ was dissolved in the resulting solvent to a concentration of 1.2 mol/L. The resulting product was used as a non-aqueous electrolyte.

Production of Test Cell

A lead was attached to each of the negative electrodes and the positive electrodes. The negative electrodes and the positive electrodes were alternately stacked one by one with the separators disposed therebetween to produce a laminate-type electrode assembly. The produced electrode assembly was put in an outer package made of an aluminum laminated sheet, and the resultant was dried at 105° C. for 2 hours and 30 minutes in vacuo. Then, the non-aqueous electrolyte was poured thereinto, and the opening of the outer package was sealed to produce a test cell (laminate-type cell). The design capacity of the test cell was 640 mAh.

Comparative Example 1

A separator was produced in the same manner as in Example, except that in production of a separator, the slurry for a heat-resistant layer was applied to the whole of the first surface and the whole of the second surface of a resin substrate to form heat-resistant layers on the whole of both respective surfaces of the resin substrate, and a test cell was produced in the same manner as in Example 1 using the resulting separator.

Comparative Example 2

A separator was produced in the same manner as in Example 1, except that in production of a separator, the slurry for a heat-resistant layer was applied to the first surface and the second surface of a resin substrate such that the coated regions (width: 5 cm) and uncoated regions (width: 5 mm) were alternated in the longitudinal direction of the resin substrate to form a heat-resistant layer and non-covered regions on both respective surfaces of the resin substrate, and a test cell was produced in the same manner as in Example using the resulting separator.

Evaluation of Penetration of Non-Aqueous Electrolyte

Each of test cells according to Example and Comparative Examples 1 and 2 were disassembled 15 minutes after production, and wetting of the separator was visually checked. It can be said that penetration of the non-aqueous electrolyte into the electrode assembly is sufficient in the cell if the whole surfaces of the separator were wet.

Evaluation of Safety

In an environment at a temperature of 25° C., each of the test cells according to Example and Comparative Examples 1 and 2 was charged at a constant current of 0.5. It until the battery voltage reached 4.3 V and then charged at a constant voltage of 4.3 V until the current value reached ¹/₂₀ It. A nail-sticking test was carried out on the test cell in a charged state using a nail with a diameter of 1 mm at a rate of 1.0 mm/sec in an environment at 25° C., and the change between the voltage before the test and that after the test and occurrence of deformation of the separator were evaluated. The safety was rated as NG when the battery showed a change of 0.1 V or more between the voltage before the nail-sticking test and that 5 minutes after sticking the nail or showed deformation of the separator, and the safety was rated as OK when the battery showed a change in the voltage of 0.1 V or less and also showed no deformation of the separator.

The results of the evaluation of penetration of the non-aqueous electrolyte and evaluation of safety in Example and Comparative Examples 1 and 2 are shown in Table 1.

TABLE 1

| Separator | | Pourability Number of Cells with Whole Surfaces of Separator Wet | Safety Number of Cells rated OK |
|---|---|---|---|
| | First Surface | Second Surface | | |
| Example 1 | Heat-resistant Layer over Whole of Surface | Heat-resistant Layer/Non-covered Region | 5/5 | 5/5 |
| Comparative Example 1 | Heat-resistant Layer over Whole of Surface | Heat-resistant Layer over Whole of Surface | 1/5 | 5/5 |
| Comparative Example 2 | Heat-resistant Layer/Non-covered Region | Heat-resistant Layer/Non-covered Region | 5/5 | 2/5 |

As can be seen from the results of the evaluations in Table 1, the product obtained in Example achieved more sufficient penetration of the non-aqueous electrolyte than the product obtained in Comparative Example 1 and greater safety than the product obtained in Comparative Example 2. Accordingly, it can be said that use of the separator according to Example 1 improves penetration of the non-aqueous electrolyte and suppresses the deformation of the separator and the variation of voltage of a battery during abnormal heat generation due to sticking of a foreign matter.

REFERENCE SIGNS LIST 10 non-aqueous electrolyte secondary battery
11 electrode assembly
12 positive electrode terminal
13 negative electrode terminal
14 battery case
15 case body
16 sealing assembly
17 insulating member
20 positive electrode
22 negative electrode
24 separator
26 positive electrode current collector
28 positive electrode mixture layer
30 negative electrode current collector
32 negative electrode mixture layer
34 resin substrate
36 first heat-resistant layer
38 second heat-resistant layer
40 non-covered region
40a, 40b lateral non-covered region

The invention claimed is:

1. A separator, comprising:
a resin substrate;
a first heat-resistant layer covering the whole of a first surface of the resin substrate; and
a second heat-resistant layer covering part of a second surface of the resin substrate, wherein
the second surface of the resin substrate consists of:
a covered region covered with the second heat-resistant layer, and
a non-covered region not covered with the second heat-resistant layer,
the second surface in plan view has a rectangular shape defined by four edges including a pair of opposed lateral edges and a pair of opposed longitudinal edges,
the first heat-resistant layer and the second heat-resistant layer each include inorganic particles and a binder, a content of the inorganic particles in each heat-resistant layer is 50 mass % to 90 mass %, and a content of the binder in each heat-resistant layer is 10 mass % to 50 mass %,
the non-covered region is in communication with an edge of the resin substrate,
the non-covered region includes a plurality of lateral non-covered regions each extending from one lateral edge to the other lateral edge of the pair of opposed longitudinal edges of the resin substrate, wherein the plurality of lateral non-covered regions are arranged at predetermined intervals in a longitudinal direction of the resin substrate, and
the covered region coincides with at least part of each of the four edges of the second surface.

2. The separator according to claim 1, wherein the binder includes polyvinylidene fluoride.

3. The separator according to claim 1, wherein respective forms of the plurality of lateral non-covered regions of the non-covered region are linear.

4. The separator according to claim 1, wherein the area of the non-covered region is 5% to 20% based on an area of the second surface of the separator.

5. The separator according to claim 1, wherein the non-covered region includes a lateral non-covered region being oblique relative to a lateral direction of the resin substrate and extending from the one lateral edge to the other lateral edge between the plurality of lateral non-covered regions.

6. A non-aqueous electrolyte secondary battery, comprising:
a positive electrode;
a negative electrode; and
a separator according to claim 1, the separator being disposed between the positive electrode and the negative electrode.

7. The non-aqueous electrolyte secondary battery according to claim 6, wherein the first heat-resistant layer faces the positive electrode.

8. A separator, comprising:
a resin substrate;
a first heat-resistant layer covering the whole of a first surface of the resin substrate; and
a second heat-resistant layer covering part of a second surface of the resin substrate, wherein
the second surface of the resin substrate consists of:
a covered region covered with the second heat-resistant layer, and
a non-covered region not covered with the second heat-resistant layer, the second surface in plan view has a rectangular shape defined by four edges including a pair of opposed lateral edges and a pair of opposed longitudinal edges, the first heat-resistant layer and the second heat-resistant layer each include inorganic particles and a binder, a content of the inorganic particles in each heat-resistant layer is 50 mass % to 90 mass %, and a content of the binder in each heat-resistant layer is 10 mass % to 50 mass %, the non-covered region is in communication with an edge of the resin substrate, and the non-covered region consists of one or more lateral non-covered regions each being oblique relative to a lateral direction of the resin substrate and extending from one lateral edge to the other lateral edge of the pair of opposed lateral edges.

9. The separator according to claim 8, wherein the binder includes polyvinylidene fluoride.

10. The separator according to claim 8, wherein the form of the non-covered region is linear.

11. The separator according to claim 8, wherein the area of the non-covered region is 5% to 20% based on an area of the second surface of the separator.

12. A non-aqueous electrolyte secondary battery, comprising:
- a positive electrode;
- a negative electrode; and
- a separator according to claim 8, the separator being disposed between the positive electrode and the negative electrode.

13. The non-aqueous electrolyte secondary battery according to claim 12, wherein the first heat-resistant layer faces the positive electrode.

* * * * *